United States Patent [19]

Hayashi et al.

[11] Patent Number: 5,122,964
[45] Date of Patent: Jun. 16, 1992

[54] ROTARY SHEAR LINE

[75] Inventors: Shigeki Hayashi, Machida; Kazuyoshi Komaya, Suita, both of Japan

[73] Assignee: Nusco Co. Ltd., Tokyo, Japan

[21] Appl. No.: 514,969

[22] Filed: Apr. 26, 1990

[30] Foreign Application Priority Data

May 1, 1989 [JP] Japan ................... 1-113472

[51] Int. Cl.[5] .................. G06F 15/46; B65H 35/08
[52] U.S. Cl. .................. 364/472; 364/474.35; 83/37
[58] Field of Search ........... 364/472, 473, 469, 471, 364/474.35; 318/571; 83/37, 311, 312, 324, 313, 38

[56] References Cited

U.S. PATENT DOCUMENTS

| | | | |
|---|---|---|---|
| 3,774,016 | 11/1973 | Sterns et al. | 364/474.35 |
| 4,283,975 | 8/1981 | Knoll | 83/37 |
| 4,724,732 | 7/1988 | Miyauchi et al. | 83/37 |
| 4,809,573 | 3/1989 | Welch | 83/37 |
| 5,054,304 | 10/1991 | Hayashi et al. | 83/65 |

*Primary Examiner*—Jerry Smith
*Assistant Examiner*—Patrick D. Muir
*Attorney, Agent, or Firm*—Pollock, Vande Sande & Priddy

[57] ABSTRACT

In a rotary shear line in which sheet stock is fed by a feeder to a rotary shear for fly cutting by its rotating cutting edges, a synchronous speed and a synchronization length are calculated by an arithmetic unit which are supplied with the cutting length and the average feed rate of the sheet stock. Reference pulses of a frequency corresponding to the synchronous speed and the synchronization length are provided to a first numerical controller for controlling the feeder and a second numerical controller for controlling the rotary shear. The first numerical controller controls the feeder to feed the sheet stock at a speed higher or lower than the synchronous speed in such a manner that when the sheet stock is fed at the synchronous speed, the length of the sheet stock short or excessive of the cutting length before its cutting is compensated for within a cutting period. The second numerical controller controls the rotary shear to rotate its cutting edges at a speed higher or lower than the synchronous speed in such a manner that when the cutting edges are rotated at the synchronous speed, the circumferential length of the locus of each cutting edge short or excessive of the circumferential length of its 360° rotation is compensated for within the cutting period.

9 Claims, 7 Drawing Sheets

PRIOR ART

PRIOR ART

ROTARY SHEAR LINE

BACKGROUND OF THE INVENTION

The present invention relates to a rotary shear line in which sheet stock is fed by a feeder to a rotary shear for fly cutting by its rotating cutters.

Figure 1:
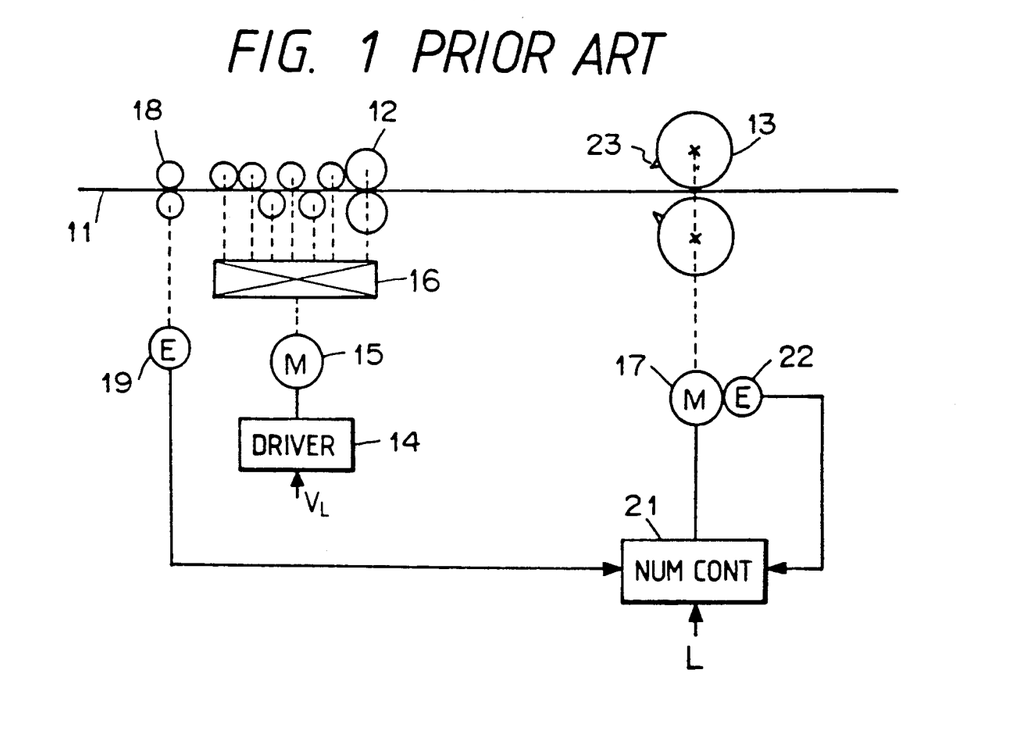
FIG. 1 is a block diagram showing a conventional rotary shear line.

FIG. 1 shows a conventional rotary shear line, in which sheet metal or similar sheet stock 11 is leveled by a leveler 12 and is then fed to a rotary shear 13. A line speed $V_L$ (i.e. the feed rate of the sheet stock 11) is set in a driver 14, by which a motor 15 is driven to rotate the leveler 12 through a distribution gear 16. The rotary shear 13 is driven by a shear motor 17. A length measuring roll 18 is held in rotary contact with the sheet stock 11 and drives an encoder 19 to yield therefrom pulses corresponding to the travel of the sheet stock 11. The pulses thus obtained are applied to a numerical controller 21. An encoder 22 is driven by the shear motor 17 to generates pulses corresponding to the rotational movement of cutting edges 23 of the rotary shear 13, and these pulses are also provided to the numerical controller 21. The numerical controller 21 controls the shear motor 17 in accordance with a preset cutting length L and the pulses input thereto.

Figure 2:
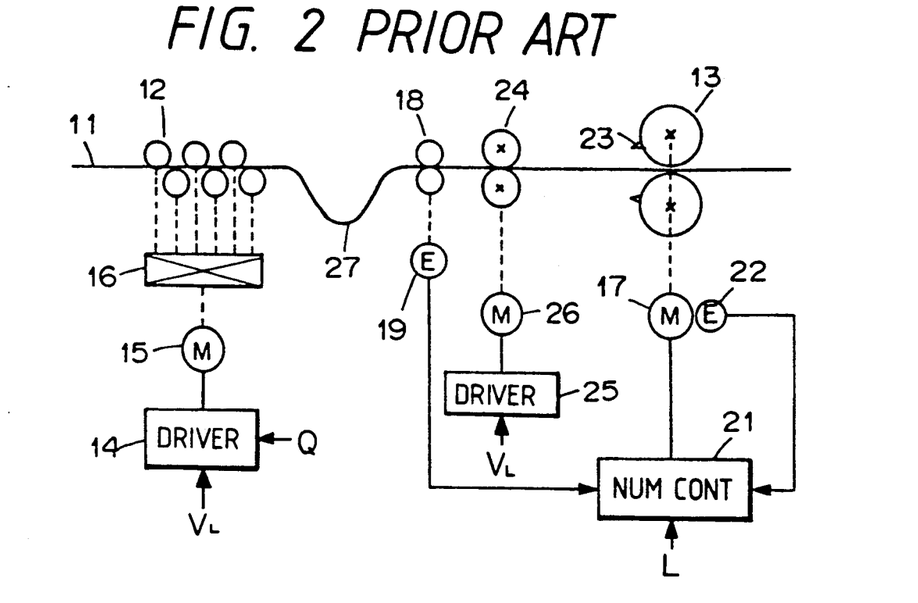
FIG. 2 is a block diagram showing another conventional rotary shear line.

FIG. 2 shows another conventional rotary shear line, in which the sheet stock 11 delivered from the leveler 12 is fed by a feeder 24 at a constant feed rate. The line speed $V_L$ (i.e. the feed rate of the sheet stock 11) is set in a driver 25, which drives a feeder motor 26 for driving the feeder 24. The same line speed $V_L$ is also set in the driver 14, which controls the motor 15 in accordance with the amount of loop 27 of the sheet stock 11 between the leveler 12 and the feeder 24; in this example, the motor 15 is controlled so that the amount of loop Ω remains substantially constant at all times.

In the rotary shear line depicted in FIG. 1 the leveler 12 may sometimes be preceded by a plating, annealing or similar processing stage, and in the rotary shear line shown in FIG. 2 the feeder 24 may sometimes be preceded by a processing stage different from the leveler 12. At any rate, the rotary shear line operates on the following principle.

The numerical controller 21 controls the rotary shear 13 through the shear motor 17 so that the upper and lower cutting edges 23 are rotated 360 degrees for each preset feed of the sheet stock 11 and mesh with each other at a distance of the preset cutting length from the forward end of the sheet stock 11 and so that the peripheral speed of each cutting edge 23 is synchronized with the feed rate of the sheet stock 11, i.e. the line speed $V_L$.

Figure 3A:
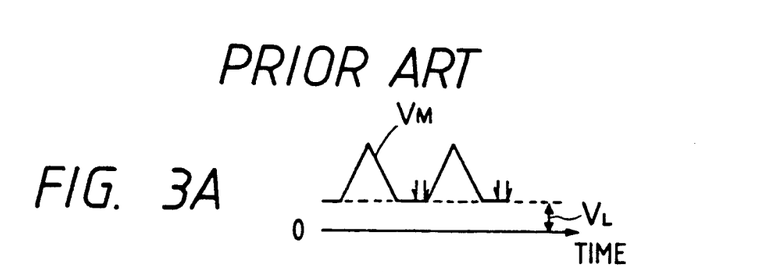
FIG. 3A is a diagram showing the rotating speed of a shear motor when the conventional rotary shear line is in a short-length cutting mode.
Figure 3B:
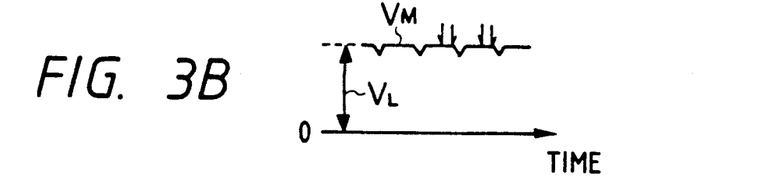
FIG. 3B is a diagram showing the rotating speed of the shear motor when the conventional rotary shear line is in a medium-length cutting mode.
Figure 3C:
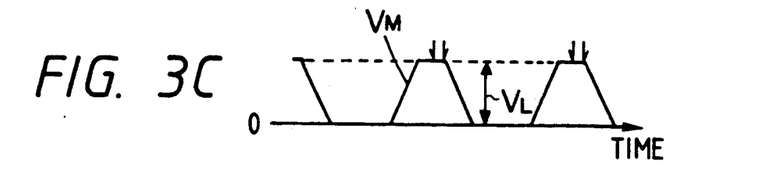
FIG. 3C is a diagram showing the rotating speed of the shear motor when the conventional rotary shear line is in a long-length cutting mode.

The rotating speed $V_M$ of the shear motor 17 varies with preset cutting lengths as shown in FIG. 3A, B and 3C. FIG. 3A shows the case where the preset cutting length is short; in this instance, the shear motor 17 is accelerated above the line speed $V_L$ and then decelerated, after which while its rotating speed remains equal to the line speed $V_L$, the shearing work takes place in such a period as indicated by the pair of arrows. FIG. 3B shows the case where the preset cutting length is medium; in this instance, the shear motor 17 is decelerated a little below the line speed $V_L$ and then accelerated, after which the shearing work takes place while its rotating speed remains equal to the line speed $V_L$. FIG. 3C shows the case where the preset cutting length is long; in this instance, the shear motor 17 is decelerated below the line speed $V_L$ and then accelerated, after which shearing work takes place while its rotating speed remains equal to the line speed $V_L$.

Figure 4:
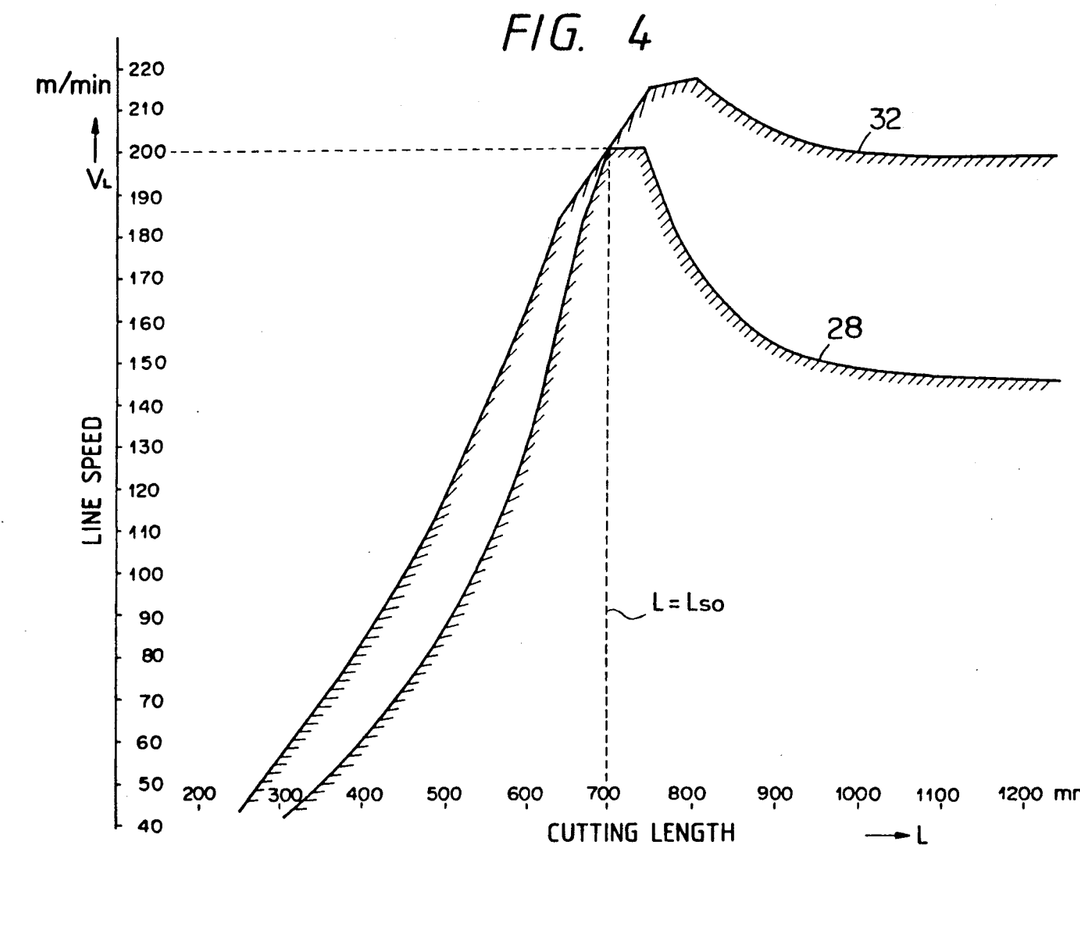
FIG. 4 is a graph showing, in comparison, characteristics of the rotary shear line of the present invention and the conventional one.
Figure 5A:
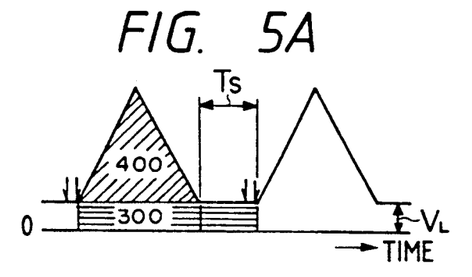
FIG. 5A is a diagram showing an example of the relationship between the rotating speed of the shear motor and the line speed in the conventional rotary shear line.
Figure 5B:
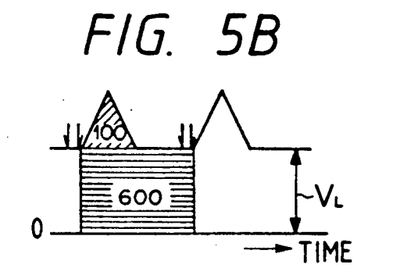
FIG. 5B is a diagram showing another example of the relationship between the rotating speed of the shear motor and the line speed in the conventional rotary shear line.
Figure 5C:
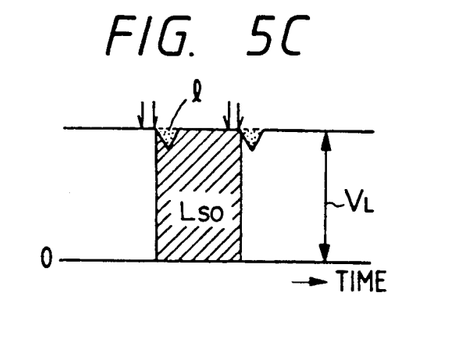
FIG. 5C is a diagram showing another example of the relationship between the rotating speed of the shear motor and the line speed in the conventional rotary shear line.
Figure 5D:
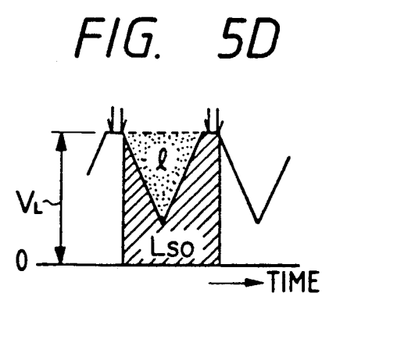
FIG. 5D is a diagram showing another example of the relationship between the rotating speed of the shear motor and the line speed in the conventional rotary shear line.
Figure 5E:
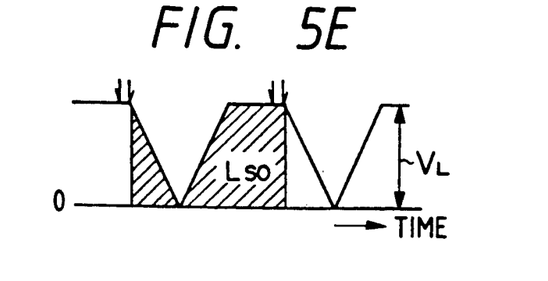
FIG. 5E is a diagram showing still another example of the relationship between the rotating speed of the shear motor and the line speed in the conventional rotary shear line.

In FIG. 4 the curve 28 shows a line speed $V_L$ vs. cutting length L characteristic which represents the performance of the conventional rotary shear line. The inside of the curve 28 (the hatched side) is the range in which sheet stock can be sheared. The locus of each cutting edge 23, which is formed when it is rotated 360 degrees, does not necessarily become a perfect circle according to the rotary shear used; in which case, however, the circumferential length corresponding to that of the cutting edge formed by its 360° rotation can be obtained by conversion. In the illustrated example, the above-mentioned circumferential length is $\Xi D = L_{SO} = 700$ mm; the rated peripheral speed of the rotary shear 13 is 200 m/min; the rated feed rate of the feeder 24 is 240 m/min; the rated acceleration of the rotary shear 13 is $$\frac{150 \text{ m/min}}{0.2 \text{ sec}} = 1.27 \, G, \text{ where } G = 9.8 \text{ m/s}^2;$$

the rated acceleration of the feeder 24 is $$\frac{240 \text{ m/min}}{0.2 \text{ sec}} = 2.04 \, G;$$

and the settling time of the rotary shear 13 and the feeder 24 (in which the rotational speed of the cutting edges 23 of the rotary shear 13 and the feed rate of the sheet stock 11 by the feeder 24 are gradually synchronized with each other and the shearing work is effected immediately before the end of the settling time) is 0.1 sec or more.

Where the cutting length L is shorter than $L_{SO} = 700$ mm, the shear motor 17 must be accelerated above the line speed $V_L$ by a value corresponding to the length $l = L - L_{SO}$ short of the circumferential length of the locus of each cutting edge 23 (the length, l, will hereinafter referred to as an adjustment length) as shown in FIG. 3A. The torque necessary for accelerating the shear motor 17 is the product of inertia and angular acceleration. The motor torque is limited, whereas the mechanism of the rotary shear 13 for cutting sheet stock through utilization of large inertia of the shear itself is inevitably heavy, because it must yield large shearing force and withstand shocks of the shearing work. This imposes appreciable limitations on the acceleration of the rotary shear 13. On this account, as the cutting length L decreases, the line speed $V_L$ must be reduced sharply as indicated by the curve 28 in FIG. 4. For instance, when the cutting length L is 300 mm, an appreciable amount of time is needed to accelerate and decelerate the shear motor 17 by an adjustment length of 400 mm as shown in FIG. 5A. In this case, since the sheet stock 11 is fed 300 mm in the period of time which is the sum of the acceleration and deceleration time and the settling time $T_S$, the line speed $V_L$ therefore is very low as depicted in FIG. 5A. The area of the obliquely hatched region represents the adjustment length and the area of the horizontally hatched region the cutting length L.

Where the cutting length L is, for example, 600 mm, however, the shear motor 17 needs only to be accelerated and decelerated for a time corresponding to an adjustment length of 100 mm as depicted in FIG. 5B. In this instance, since the sheet stock 11 must be fed as long as 600 mm throughout the acceleration and deceleration time and the settling time, the line speed $V_L$ is far higher than in the case of FIG. 5A.

Where the cutting length L is equal to $\Xi D = L_{SO} = 700$ mm, the shear motor 17 need not be accelerated and decelerated, and hence the line speed $V_L$ can naturally be increased as desired, but it is limited by the rating of the shear motor 17 or the feeder motor 26. In the case of the curve 28 in FIG. 4, the line speed $V_L$ is limited by the rating of the shear motor 17 and is 200 mm/min.

Where the cutting length L is a little longer than $\Xi D = L_{SO} = 700$ mm, that is, where the adjustment length $l = L - L_{SO}$ is small, the shear motor 17 is decelerated below the line speed $V_L$ by the adjustment length l as depicted in FIG. 5C, but since this deceleration is slight, the line speed $V_L$ may be held high. Where the adjustment length l is large to some extent as shown in FIG. 5D, however, if the line speed $V_L$ remains high, the time for acceleration and deceleration of the shear motor 17 must be extended to adjust the length l, and consequently, no sufficiently long settling time can be provided prior to cutting. On such an occasion, cutting inevitably takes place before substantially complete synchronization is established between the rotating speed of the cutting edges 23 of the rotary shear 13 and the feed rate of the sheet stock 11 by the feeder 24. This results in lowering of the cutting accuracy and leads to variations in the sizes of individual pieces cut off the sheet stock 11. To avoid this, it is necessary in this instance to increase the cutting length L and decrease the line speed $V_L$ as indicated by the curve 28 in FIG. 4. By reducing the line speed $V_L$ to such an extent as to permit the shear motor 17 to stop as shown in FIG. 5E, the sheet stock 11 can be cut into desired length, no matter how long they may be, if only the stopping time of the shear motor 17 is selected long as depicted in FIG. 3C. Thus, the line speed $V_L$ becomes constant in the longer cutting length region as seen from the curve 28 in FIG. 4.

For the reasons given above, the $V_L - L$ curve of the numerically-controlled rotary shear line of any mechanism is, in principle, similar to the curve 28.

As described above, in the conventional rotary shear line the speed must be slowed down materially for cutting sheet stock into short lengths.

Where the line speed is so low that the flywheel effect of the rotary shear including the shear motor cannot be expected yet sheet stock cannot be cut only with the torque of the shear motor—in practice, this often occurs under restrictions on the manufacturing cost of the machine—, the rotary shear may sometimes come to a halt without cutting the sheet stock because of the low line speed, or even if the sheet stock can be cut, the rotary shear almost stops its rotation, with the result that the sheet stock being fed is blocked by the cutting edges and hence it curves into a hump.

For the same reasons as mentioned above, the sheet stock cannot be cut into desired medium and long lengths, either, when the line speed is low.

Also when the cutting length L is longer than the afore-mentioned circumferential length $L_{SO}$ of the locus of each cutting edge 23, the line speed $V_L$ must be decreased though not so much as in the case of the short cutting length.

SUMMARY OF THE INVENTION

A first object of the present invention is to provide a rotary shear line in which the line speed need not be decreased so much as in the prior art in the case of cutting sheet stock into short length.

A second object of the present invention is to provide a rotary shear line in which, also when the cutting length is short, the peripheral speed of cutting edges of the rotary shear can be increased to a value higher than the line speed, i.e. a value at which cutting of sheet stock can easily be done by the aid of the flywheel effect.

A third object of the present invention is to provide a rotary shear line which permits cutting of sheet stock at the same high speed as mentioned above even if the line speed is low.

A fourth object of the present invention is to provide a rotary shear line which permits cutting of sheet stock into lengths larger than the afore-mentioned circumferential length $L_{SO}$ of the cutting edge without the necessity of reducing the line speed so much as is needed in the prior art.

A fifth object of the present invention is to provide a rotary shear line in which a relatively sufficient settling time can be provided and the feed rate of sheet stock need not be changed with the line speed at the preceding stage and is very stable, ensuring high cutting accuracy.

In the rotary shear line of the present invention in which sheet stock is fed by a feeder to a rotary shear for fly cutting by its rotating cutters, the average travel speed of the sheet stock (the line speed) and the cutting length are applied to a numerical controller, which accelerates and decelerates both of the feeder and the rotary shear and then settles them down to a certain speed (which will hereinafter be referred to as a synchronous speed). That is, the present invention attains the above-mentioned objects by accelerating and decelerating the feeder as well as the rotary shear, i.e. by operating them in cooperation with each other. Thus, the feeder is also accelerated and decelerated, but its average speed is the line speed following the speed at the preceding stage and is independent of the above-said synchronous speed. Accordingly, even if the average speed of the feeder is low, the synchronous speed can be increased.

DETAILED EXPLANATION OF PREFERRED EMBODIMENT

Figure 6:
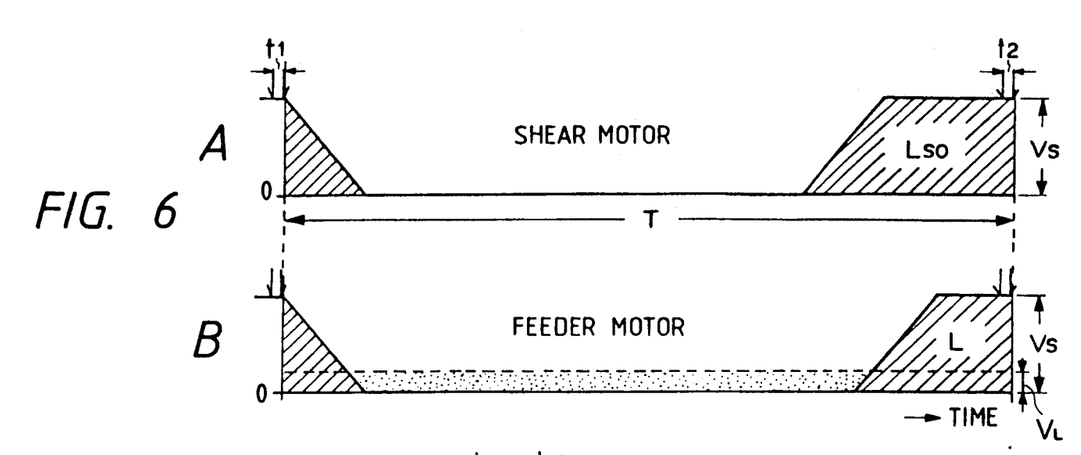
FIG. 6 is a diagram showing one cutting mode of the rotary shear line of the present invention.

A description will be given first of various cutting modes which are performed by the rotary shear line of the present invention which will be described later with reference to FIG. 10. A first cutting mode is used when the average line speed $V_L$ is very low. The rotating speed of the motor for the rotary shear 13 is shown at row A in FIG. 6 and the rotating speed of the motor for the feeder 24 at row B in FIG. 6. The sum of the areas of obliquely hatched regions at row A in FIG. 6 represents the circumferential length $L_{SO}$ of the locus of each cutting edge, 700 mm in the afore-mentioned example, and the sum of the areas of obliquely hatched regions at row B in FIG. 6 represents the length of sheet stock fed, i.e. the cutting length L, about 450 mm in this example. After cutting the sheet stock in the period $t_1$ the rotary shear 13 and the feeder 24 are both slowed down and stopped, and as the feed length of the sheet stock approaches the cutting length, they are accelerated to a synchronous speed $V_S$ and while they settle, the cutting edges mesh with each other. In this way, even if the average line speed $V_L$ is low, the sheet stock can be cut at the high synchronous speed $V_S$, achieving the third object of the present invention. For such a cutting mode the feed rate by the feeder 24 is controlled in cooperation with the rotary shear 13 as described later with reference to FIG. 10.

Next, a description will be given, with reference to FIG. 7, of a second cutting mode in which the sheet stock is cut into short lengths ($L < L_{SO}$). As shown at row A in FIG. 7, in a cutting period T (sec) the shear motor 17 is accelerated above the synchronous speed $V_S$ by a value corresponding to the difference, $L_{SO} - L_S$, between the amount of movement $L_{SO}$ of the cutting edge per rotation and the amount of movement $L_S$ (the obliquely hatched region, hereinafter referred to as a synchronization length) of the cutting edge in the case where it is assumed that it moves at the synchronous speed $V_S$ higher than the average line speed $V_L$. Here, $$T = \frac{L_S}{V_S} \quad (1)$$

60/T represents the number of cutting operations per minute. On the other hand, the feeder motor 26 is decelerated below the synchronous speed $V_S$ by a value corresponding to the difference, $L_S - L$, between the synchronization length $L_S$ and the cutting length L as shown at row B in FIG. 7, the synchronization length $L_S$ being the feed length in the case where it is assumed that the feeder 24 feeds the sheet stock at the synchronous speed $V_S$ higher than the average line speed $V_L$. Since the feeder 24 feeds the sheet stock by the cutting length L in the period T, the average line speed $V_L$ is given by $$V_L = \frac{L}{T} \quad (2)$$

In this way, the synchronous speed $V_S$ during cutting becomes higher than the average line speed $V_L$, thus attaining the second object of the present invention.

Figure 7:
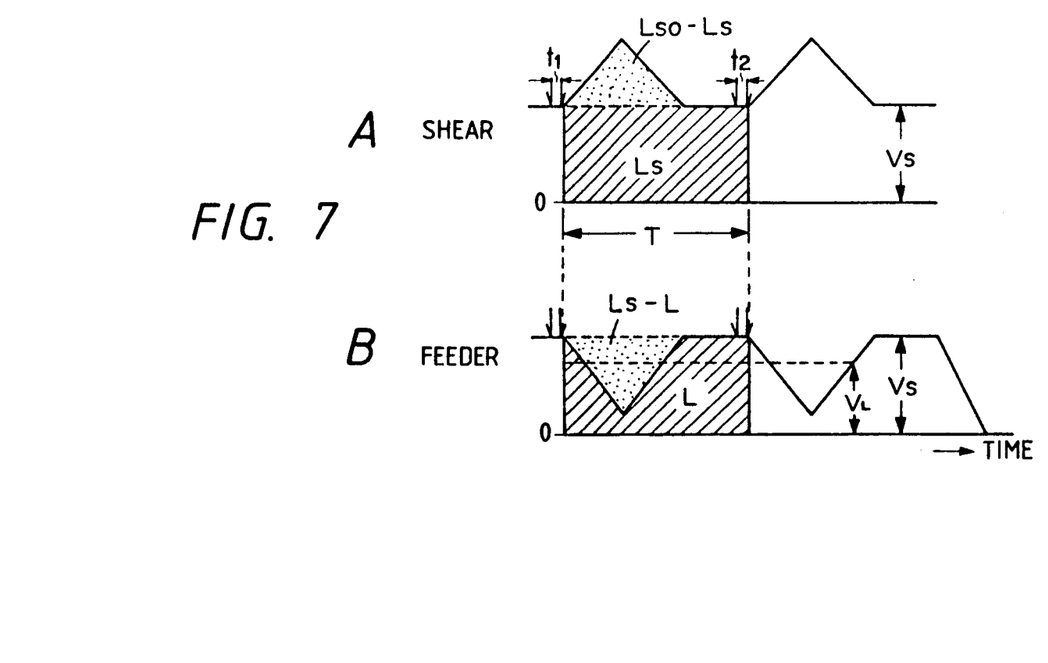
FIG. 7 is a diagram showing another cutting mode of the rotary shear line of the present invention.
Figure 8:
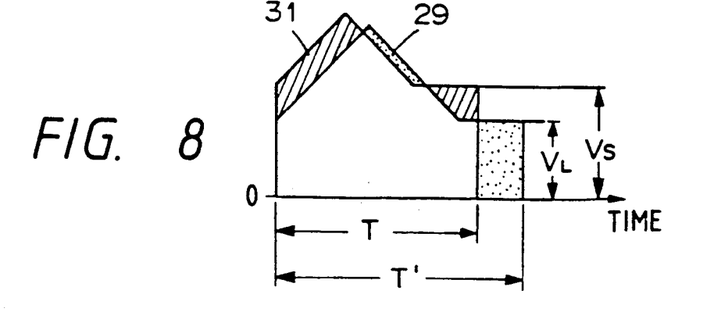
FIG. 8 shows the comparison of cutting modes of the rotary shear lines of the present invention and the prior art example.

In FIG. 8 the curve 29 represents the rotating speed of the shear motor 17 in the case of rotating the rotary shear 13 through 360 degrees to settle it at the line speed $V_L$ as in the prior art, not the synchronous speed $V_S$, and the curve 31 represents the speed curve shown as row A in FIG. 7. It is assumed that the acceleration and the settling time are the same in the both cases. In the case of settling the rotary shear at the line speed $V_L$, the rotary shear 13 cannot be rotated 360 degrees in the period T for the synchronous speed $V_S$. The areas which are obtained by integrating the speed curves 29 and 31 with time for the period T' and T, respectively, are each required to be equal to the circumferential length $L_{SO}$. That is, the sum area of the obliquely hatched regions must be equal to the sum area of the dotted regions. In the case of settling the rotary shear 13 at the line speed $V_L$ as in the prior art, the cutting period becomes T', which is longer than T, and the cutting length L' in this case is $V_L T'$, and hence $L' > L$. In other words, according to the present invention, the cutting period T is reduced, and consequently, when the cutting length L is the same, the average line speed $V_L$ becomes higher than in the case of the conventional rotary shear line, as seen from Eq. (2). Accordingly, as indicated by the curve 32 in FIG. 4, the $V_L$-L characteristic of the rotary shear of the present invention is appreciably improved in the short cutting length region as compared with the characteristic curve 28 of the conventional rotary shear. For example, when the cutting length L is 500 mm, the line speed $V_L$ in the prior art is about 85 m/min and the number of cutting operations per minute is about 170, whereas in the present invention the line speed $V_L$ is about 116 m/min and the number of cutting operations per minute is about 230. Thus, the first object of the present invention is attained.

Figure 9:
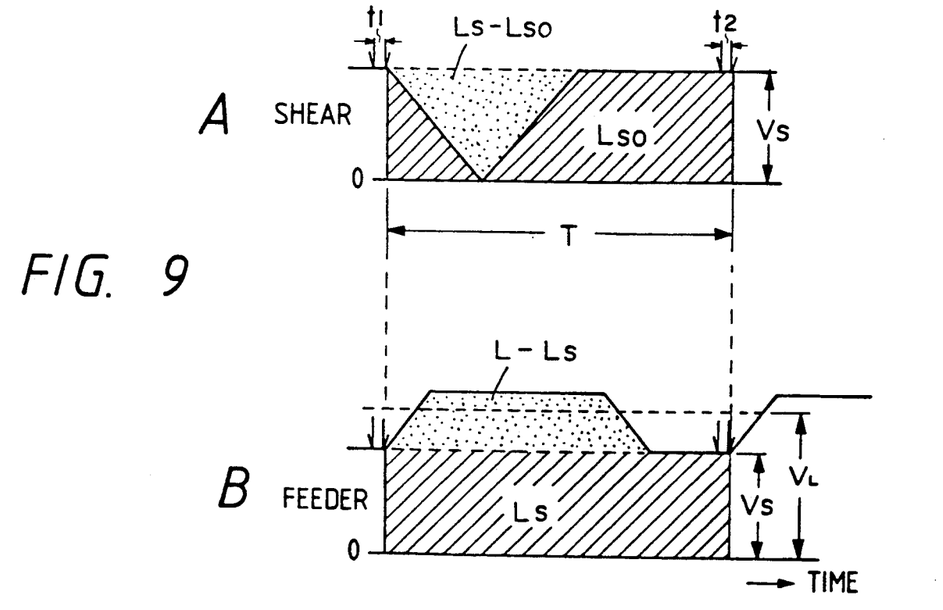
FIG. 9 is a diagram showing a further cutting mode of the rotary shear line of the present invention.

Next, a description will be given, with reference to FIG. 9, of a third cutting mode in which the sheet stock is cut into long lengths ($L > L_{SO}$). In this instance, as shown at row A in FIG. 9, the shear motor is decelerated below the synchronous speed $V_S$ by a value corresponding to the difference, $L_S-L_{SO}$, between the synchronous speed $L_S$ and the afore-mentioned circumferential length $L_{SO}$, and consequently, the cutting period T increases. On the other hand, the feeder motor is accelerated above the synchronous speed $V_S$ by a value corresponding to the difference, $L-L_S$, between the synchronization length $L_S$ and the cutting length L, as shown at row B in FIG. 9. In this example, the speed of the feeder motor is limited to its rated speed, but since the sheet stock is fed at a speed higher than the synchronous speed $V_S$, the cutting length L increases; in other words, the line speed $V_L$ becomes higher than the synchronous speed $V_S$. In the conventional rotary shear line, the rotating speed depicted at row A in FIG. 9 is the same as that shown in FIG. 5E and the maximum line speed cannot be made higher than the synchronous speed $V_S$ at row A in FIG. 9 as seen from the curve 28 in the larger cutting length region in FIG. 4. In the present invention, however, the line speed $V_L$ can be raised to a value close to the maximum speed of the feeder motor. Accordingly, the $V_L-L$ characteristic is appreciably improved also in the longer cutting length region, as compared with the $V_L-L$ characteristic of the conventional rotary shear line. That is, the fourth object of the present invention is thus attained.

As will be appreciated from the above and comparison of the curves 28 and 31 in FIG. 4, according to the present invention, the capability of the rotary shear line is markedly enhanced as compared with the prior art; therefore, the line need not always be run at the upper limit of its capacity but instead a sufficient amount of time is consumed for settling the rotary shear and the feeder or the acceleration and deceleration are lowered to thereby reduce external disturbance such as mechanical shock, by which the cutting accuracy can be improved. This can be accomplished by the rotary shear line of the present invention shown in FIG. 10 in which desired acceleration and deceleration are shared between the rotary shear and the feeder by operating them in cooperation with each other as referred to previously.

So long as the cutting length L is within a range of possible cutting length, the synchronous speed $V_S$ may not be changed even if the line speed $V_L$ or the cutting length L is altered. The use of a constant synchronous speed $V_S$ is desirable because when the feed rate during cutting of sheet stock varies, delicate differences in the cutting length often occur before and after the change in the feed rate. Accordingly, the cutting accuracy can be enhanced by minimizing the necessity of changing the synchronous speed $V_S$.

Besides, a pulse train which represents the apparent feed length of sheet stock is obtained from an oscillator as described later, and hence its count value (corresponding to length) and its frequency (corresponding to speed) are highly stable as compared with the count value and the frequency of the pulses available from the encoder 19 (FIGS. 1 and 2) in the prior art. This also serves to improve the cutting accuracy. Thus, the fifth object of the present invention is achieved.

Figure 10:
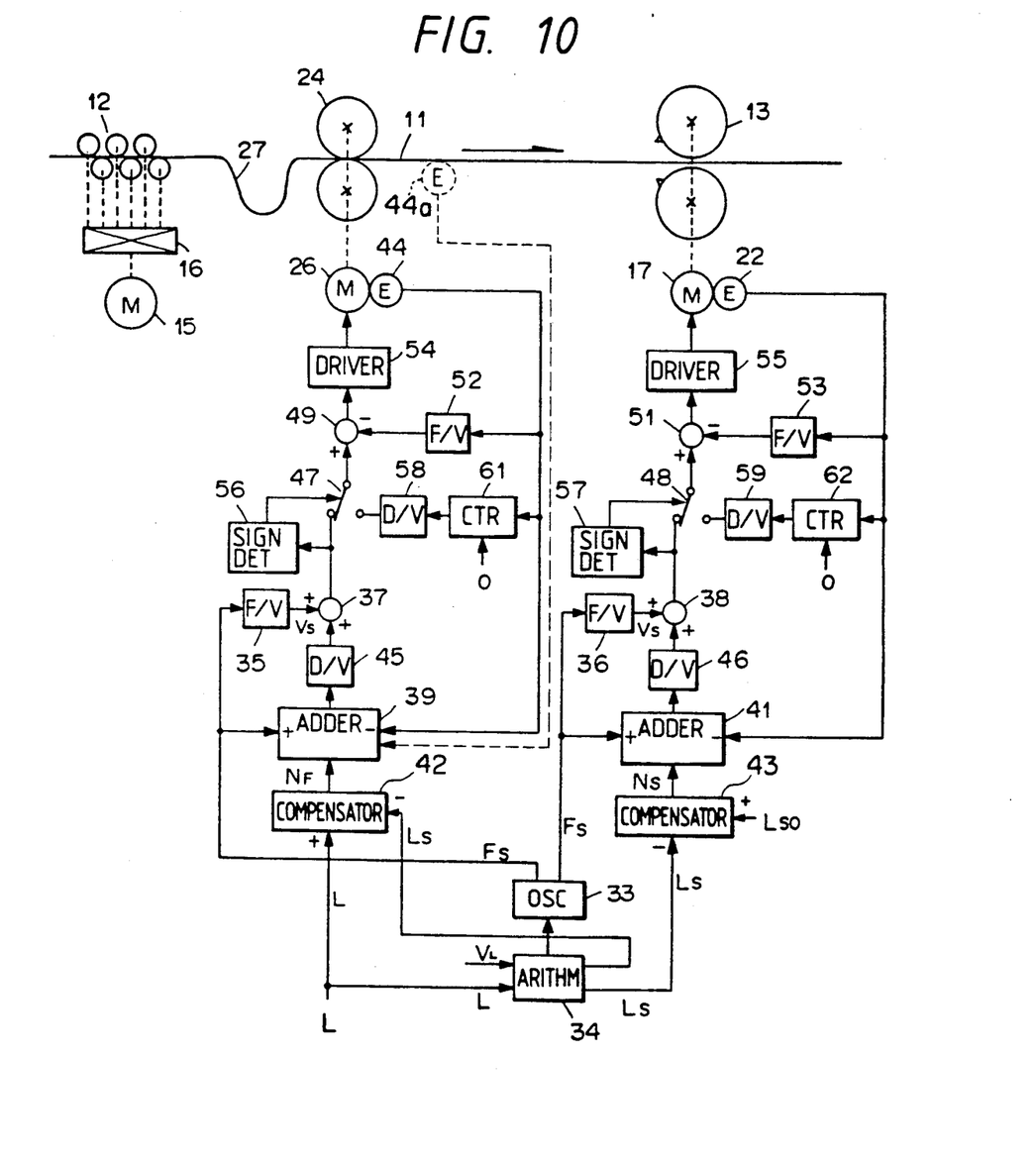
FIG. 10 is a block diagram illustrating the construction of the rotary shear line of the present invention.

FIG. 10 illustrates an embodiment of the rotary shear line of the present invention, which employs the same line construction as that of the prior art example shown in FIG. 2. The feeder 24 is driven by the feeder motor 26 and the rotary shear 13 is driven by the shear motor 17. The feeder motor 26 and the shear motor 17 are each numerically controlled, and this control is effected by substantially the same system as that disclosed in U.S. Pat. No. 4,266,276, for example. In the system of the U.S. patent reference pulses are provided from a length measuring encoder, whereas in the present invention they are obtained from an oscillator 33. The line speed $V_L$ and the cutting length L are provided to an arithmetic unit 34, from which a synchronization frequency $F_S$ and the synchronization length $L_S$ are obtained as described later, and the oscillator 33 yields reference pulses $F_S$ of the frequency $F_S$. The reference pulses $F_S$ are converted by frequency-velocity converters 35 and 36 into the afore-mentioned synchronous speed $V_S$, which is applied as a reference speed (the apparent line speed) to speed control adders 37 and 38 which form minor loops on the feeder 24 side and the shear 13 side, respectively. Adders 39 and 41 for position control use which constitute major loops on the feeder side and the shear side are also supplied with the reference pulses $F_S$ as pulses for controlling the feeder side and the shear side, respectively.

The synchronization length $L_S$ calculated by the arithmetic unit 34 is provided to compensators 42 and 43 on the feeder side and the shear side, respectively. The synchronization length $L_S$ acts as the apparent circumferential length $L_{SO}$ on the feeder side and as the apparent present cutting length L on the shear side. That is, the actual preset cutting length L is provided to the compensator 42 on the feeder side, in which a compensation value $N_F=L-L_S$ is computed, and the compensation value $N_F$ is preset in the adder 39 for each cutting. On the other hand, the circumferential length $L_{SO}$ is provided to the compensator 43 on the shear side, in which a compensation value $V_S=L_{SO}-L_S$ is calculated, and the compensation value $N_S$ is preset in the adder 41 for each cutting. In the adder 39 a predetermined value is added to its current value upon each input thereinto of the reference pulse $F_S$ and a predetermined value is subtracted from its current value upon each input thereinto of a pulse from an encoder 44 which is driven by the feeder motor 26. In the adder 41 a predetermined value is added to its current value upon each input thereinto of the reference pulse $F_S$ and a predetermined value is subtracted from its current value upon each input thereinto of a pulse from the encoder 22. In the addition and the subtraction by each of the adders 39 and 41 on the feeder side and the shear side, each predetermined value to be added by the reference pulse $F_S$, each predetermined value to be subtracted by the feedback pulse from each of the encoders 44 and 42, and the compensation values $N_F$ and $N_S$ are respectively multiplied by suitable coefficients or weights so that they are of the same unit of value. A method for determining the compensation values $N_F$ and $N_S$ can easily be understood from the afore-mentioned U.S. patent, and hence will not be described in detail.

Upon application of a cutting end signal (which is produced by, for example, a sensor or counter (not shown) which detects one rotation of the rotary shear 13), the frequency $F_S$ and the synchronization length $L_S$ for the next cutting are provided from the arithmetic unit 34, and the adders 39 and 41 are supplied with the compensation values $N_F$ and $N_S$, respectively. In the case of row A in FIG. 7, $N_S=0$; in the case of row B in FIG. 7, $N_F<0$; in the case of row A in FIG. 9, $N_S<0$; and in the case of row B in FIG. 9, $N_F>0$. By inputting the compensation values $N_F$ and $N_S$, not in an instant, but little by little so that the adders 39 and 41 will ultimately be supplied with the values $N_F$ and $N_S$, respectively, the acceleration and deceleration of the feeder motor and the shear motor can be adjusted. The count values of the adders 39 and 41 are converted by digital value-velocity converters 45 and 46 into velocity signals, which are applied to the adders 37 and 38. The outputs of the adders 37 and 38 are provided as velocity references to subtractors 49 and 51 via switches 47 and 48. The pulses from the encoders 44 and 22 are converted by frequency-velocity converters 52 and 53 into velocity signals, which are fed back to the subtractors 49 and 51. The frequency-velocity converters 52 and 52 output positive signals when the motors 26 and 17 are driven in the forward direction (the direction which agrees with the direction of feed of the sheet stock 11), and when the motors are driven in the backward direction, the converters produce negative signals. The outputs of the subtractors 49 and 51 are applied as drive signals to drivers 54 and 55, the outputs of which are applied to the motors 26 and 17 to drive them. Accordingly, when the compensation values $N_F = L - L_S$ and $N_S = L_{SO} - L_S$ are newly set in the adders 38 and 41 after completion of the cutting of the sheet stock 11 while the sheet stock 11 and the cutting edges of the rotary shear 13 are both moving at the same synchronous speed $V_S$, the feeder motor 26 and the shear motor 17 are respectively accelerated above and decelerated below the synchronous speed $V_S$ by the compensation values $N_F$ and $N_S$, after which the feeder motor 26 and the shear motor 17 are synchronized with the synchronous speed $V_S$, in which state the sheet stock 11 is cut. The digital value-velocity converters 45 and 46 have such a conversion characteristic that they provide linear speed changes, that is, permit linear acceleration and deceleration, and the slope of the conversion characteristic can be changed. For example, by decreasing the slope, mechanical shocks can be alleviated.

There are cases where the velocity references, i.e. the outputs of the adders 37 and 38 become minus because the compensation values $N_F$ and $N_S$ sometimes become largely minus. In such a case, the feeder motor 26 and the shear motor 17 are not reversed but instead they are stopped and held in the waiting state as shown at rows A and B in FIG. 6. When the velocity references from the major loop, that is, the outputs of the adders 37 and 38 are reduced to zero, the switches 47 and 48 are switched by sign detectors 56 and 57 to digital value-velocity converters 58 and 59, respectively. The pulses from the encoders 44 and 22 are counted by counters 61 and 62, respectively, and their count values are converted by the digital value-velocity converters 58 and 59 into velocity signals. The counters 61 and 62 are preset to zero at the time of changing over the switches 47 and 48. During the forward rotation of the motors 26 and 17 the counters 61 and 62 subtractively count the pulses in accordance with the direction of rotation of the encoders 44 and 42, and during the backward rotation of the motors 26 and 17 the counters 61 and 62 additively count the pulses in accordance with the direction of rotation of the encoders 44 and 22. The count values of the counters 61 and 62 are fed back as velocity signals from the digital value-velocity converters 58 and 59, by which stop positioning control is effected. In this instance, the counter 62 may be preset to a preset value other than zero to that after cutting the sheet 11 the motor 17 is further driven to bring the cutting edges of the rotary shear 13 to the upper and lower dead points, respectively.

Next, a description will be given of a method for computing the frequency $F_S$ and the synchronization length $L_S$ by the arithmetic unit 34. A desired line speed $V_L$ may be set in the arithmetic unit 34 independently or a measured line speed value $V_L$ detected in the preceding line stage may also be set. The condition for computing the frequency $F_S$ and the synchronization length $L_S$ that is considered to be most suitable for use in the present invention is as follows: That is, the shear motor 17 and the feeder motor 26 are accelerated and decelerated with about the same load factor for the same period of time, and consequently, they are settled for the same time before cutting.

Even with about the same load factor, acceleration of the feeder can usually be made greater than that of the shear. The load on the feeder is the feed rolls and the sheet stock, and the sheet stock intended to be handled in the rotary shear line of the present invention is a plated sheet metal, surface treated steel sheet, aluminum plate, or paper, and hence is relatively lightweight, but high-speed processing is desirable for them. The feeder itself is also far smaller in weight, because the rolls are hollow and simple-structured. In the example shown in FIG. 4, the acceleration of the feeder is 1.6 times higher than the acceleration of the shear, and the rated speed of the shear is 200 m/min, whereas the rated speed of the feeder is 240 m/min. The acceleration of the feeder is set to about 2 G. By selecting the shape of the loop 27 of the sheet stock 11 at the preceding stage of the feeder, instead of using such a free catenary structure as shown in FIG. 10, it is possible to prevent lateral rocking of the loop when the acceleration of the feeder is 3 G or more and jumping of the sheet stock by sudden deceleration.

Figure 11:
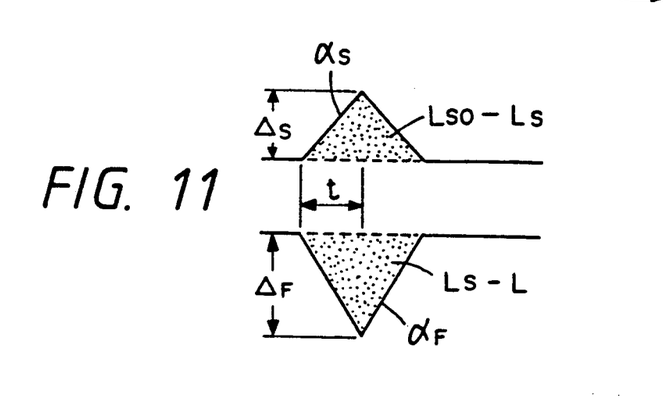
FIG. 11 is a diagram showing the acceleration and deceleration of the feeder and the rotary shear, for explaining how to determine the synchronization length in the present invention.

The following equation is obtained, as an equation for the afore-mentioned condition, from the relationships shown in FIG. 11 corresponding to those at rows A and B in FIG. 7.

$$\frac{L_{SO} - L_S}{L_S - L} = \frac{\Delta_S}{\Delta_F} = \frac{\Delta_S/t}{\Delta_F/t} = \frac{\alpha_S}{\alpha_F} \qquad (3)$$

$$L_S - L = \frac{\alpha_F}{\alpha_S}(L_{SO} - L_S)$$

$$L_S = \frac{\frac{\alpha_F}{\alpha_S} \times L_{SO} + L}{1 + \frac{\alpha_F}{\alpha_S}}$$

where $\alpha_S$ is the acceleration of the shear and $\alpha_F$ is the acceleration of the feeder.

Thus, the synchronization length $L_S$ is obtained, and once the synchronization length $L_S$ is obtained, the synchronous speed $V_S$ can be obtained from Eqs. (1) and (2) as follows:

$$V_S = \frac{L_S}{L} V_L \qquad (4)$$

When the line speed $V_L$ is low, however, the synchronous speed $V_S$ also becomes low, if its value given by Eq. (4) remains unchanged. To avoid this, the lower limit is placed on the synchronous speed $V_S$. The lower limit of the synchronous speed $V_S$ is dependent on the lowest rotating speed of the shear 13 necessary for cutting the sheet stock 11 through utilization of the flywheel effect. The upper limit is also set on the synchronous speed $V_S$ by rating specifications, and it is limited to the maximum speed of either one of the shear and the feeder whose rotating speed is lower than the other. Usually the speed of the shear is lower than the speed of the feeder. In the example of FIG. 4, the speed 200 m/min of the shear is the maximum value $V_{SMAX}$ of the Synchronous speed $V_S$. Even if the minimum value $V_{SMIN}$ of the synchronous speed $V_S$ is 50% of the maximum value $V_{SMAX}$, sheet stock can be cut into considerably short lengths. However, when the synchronous speed $V_S$ assumes the minimum value $V_{SMIN}$ or maximum value $V_{SMAX}$, Eq. (3) does not hold and the arithmetic unit 34 is supplied with the above-mentioned synchronous speed and computes the synchronization length $L_S$ from the following equation:

$$L_S = \frac{V_S}{V_L} L \quad (5)$$

For further enhancement of the cutting accuracy it is desirable that the synchronous speed $V_S$ does not often change as mentioned previously. In such a case, when the line speed $V_L$ or the cutting length L is somewhat changed, the synchronous length can be held unchanged as long as the loop of sheet stock permits. Also at this time, the arithmetic unit 34 changes only the synchronous length $L_S$ in accordance with changes in the line speed $V_L$ and the cutting length L.

According to the curve 32 in FIG. 4, when the cutting length L is approximately 300 mm, the synchronous speed $V_S$ is 100 m/min (50% of the maximum value $V_{SMAX}$). Even when the cutting length L is as short as 300 mm, the problem that must be considered in this kind of rotary shear line is posed merely in runout of the sheet stock after cutting.

The curve 32 in FIG. 4, which represents the maximum possible line speed for the cutting length L, can be obtained by collecting data with the allowable load factor and the allowable rotating speed of the motors in the actual running of the rotary shear line (without using sheet stock). The curve 32 is stored in the arithmetic unit 34. When the line speed $V_L$ and the cutting length L applied to the arithmetic unit 34 are in such a range in which they can be freely selected, the shear and the feeder are controlled using relatively small acceleration and deceleration, and when the line speed $V_L$ and the cutting length L are on or slightly below the curve 32, the shear and the feeder are controlled using substantially maximum acceleration and deceleration. Where the line speed $V_L$ and the cutting length L are out of the cutting possible range, the arithmetic unit 34 yields a reject signal.

Although the rotary shear line in FIG. 10 is shown to be formed using hardware, the parts except such power units as the motors, the encoders and the drivers, may be formed using software. The motors may be AC or DC motors, and consequently, the drivers may also be vector control type inverters, DC choppers, or thyristor converters. By selecting the synchronization length $L_S$ equal to the cutting length L, the feeder speed is constant and only the shear is accelerated and decelerated as in the conventional rotary shear line. By selecting the synchronization length $L_S$ equal to the circumferential length $L_{SO}$, the shear speed becomes constant and while the shear is rotated 360 degrees, the feeder is accelerated and decelerated and the cutting length becomes L. When the shear is too heavy, such methods can be employed for cutting sheet stock into some lengths. Occasionally the situation arises where it would be desirable to drive the shear at a speed 1 to 5% higher than the speed of the feeder so as to improve the cut face. In such an instance, the frequency $F_S$ of the reference pulses and the synchronization length $L_S$ which are supplied to the shear side are increased, by the factor being set, above the frequency $F_S$ of the reference pulses and the synchronization length $L_S$ which are provided to the feeder side. While the rotary shear is shown to be a drum shear, crank shear and other shears can be employed. In short, the rotary shear needs only to be a flying cutter whose cutting edges are moved back and forth and up and down along a circular, elliptic or some other locus by the rotation of the shear motor 17 in one direction.

The number of pulses from the encoder 44 which are cumulatively subtracted by the adder 39 in the embodiment of FIG. 1 correspond to the feed length of the sheet stock 11. However, when the sheet stock 11 and the feeder 24 slip relative to each other or the rolls of the feeder 24 are deformed by being screwed down onto the sheet stock 11, an error is produced in the correspondence between the number of pulses from the possible to employ, instead of supplying the pulses from the encoder 44 to the adder 39, an arrangement in which an encoder 44a is provided in rotary contact with the sheet stock 11 as indicated by the broken line in FIG. 10 so that pulses corresponding to the distance of the sheet stock 11 traveled are applied to the adder 39.

As described above, according to the present invention, the feeder and the shear are accelerated and decelerated in cooperation with each other, by which, even when the sheet stock is cut into short lengths, the line speed $V_L$ need not be reduced so much and the feed rate of the sheet stock can be made higher than the line speed $V_L$, that is, the speed which permits easy cutting of the sheet stock through utilization of the flywheel effect. Also when the line speed is low, cutting can be achieved at a speed higher than the line speed. Moreover, even if the cutting length is larger than the circumferential length $L_{SO}$ of the cutting edge, the line speed need not be decreased so much. Furthermore, a relatively sufficient amount of time can be consumed for settling the shear and the feeder, the feed rate of the sheet stock need not be changed with a slight change in the line sped, and the feed rate of the sheet stock is provided in the controller and hence is very stable. Accordingly, the cutting accuracy can be improved.

It will be apparent that many modifications and variations may be effected without departing from the scope of the novel concepts of the present invention.

What is claimed is:

1. A rotary shear line comprising:
   a feeder for feeding sheet stock;
   a rotary shear for fly cutting said sheet stock from said feeder by rotating cutting edges;
   a first motor for driving said feeder;
   a second motor for rotating said cutting edges of said rotary shear;
   first numerical control means for controlling said first motor;
   second numerical control means for controlling said second motor; and
   arithmetic means which is supplied with an average travel speed of said sheet stock and its cutting length and, based on said average travel speed and said cutting length, calculates a synchronous speed and a synchronization length and then outputs reference pulses of a frequency corresponding to said synchronous speed and said synchronization length;

wherein said first control means is supplied with said cutting length, said reference pulses from said arithmetic means and said synchronization length, and controls said first motor so that during a period in which said cutting edges are assumed to rotate by said synchronization length at said synchronous speed, said first motor feeds said sheet stock by said cutting length and before the feed length of said sheet stock reaches said cutting length, the feed rate of said sheet stock reaches said synchronous speed and is held; and wherein said second numerical control means is supplied with a circumferential length of one rotation of the locus of said cutting edges, said reference pulses from said arithmetic mean and said synchronization length, and controls said second motor so that during a period in which said sheet stock is assumed to travel by said synchronization length at said synchronous speed, said second motor rotates said cutting edges by said circumferential length and before said rotation of said cutting edges reaches at least said circumferential length, the rotational speed of said cutting edges reaches said synchronous speed and is held.

2. The rotary shear line of claim 1, wherein said first numerical control means includes: first encoder means for generating pulses corresponding to the feed of said sheet stock; first add/subtract means which creates a first compensation value by subtracting said synchronization length from said cutting length, sets therein said first compensation value for each cutting of said sheet stock, cumulatively adds a predetermined value to said first compensation value upon each application of said reference pulse, and cumulatively subtracts a predetermined value from said first compensation value upon each application of a pulse from said first encoder means; and first velocity reference generating means which adds together said synchronous speed and the output of said first add/subtract means and outputs the result of addition as a first velocity reference signal for controlling the speed of said first motor; and wherein said second numerical control means includes: second encoder means for generating pulses in accordance with the rotation of said second motor; second add/subtract means which creates a second compensation value by subtracting said synchronization length from said circumferential length, sets therein said second compensation value for each cutting of said sheet stock, cumulatively adds a predetermined value to said second compensation value upon each application of said reference pulse, and cumulatively subtracts a predetermined value upon each application of the pulse from said second encoder means; and second velocity reference generating means which adds together said synchronous speed and the output of said second add/subtract means, and outputs the result of addition as a second velocity reference signal for controlling the speed of said second motor.

3. The rotary shear line of claim 2, wherein said first numerical means includes: sheet stock feed rate generating means whereby the frequency of said pulses from said encoder means is output as a sheet stock feed rate signal representing the feed rate of said sheet stock; and first subtract means which subtracts said sheet stock feed rate signal from said first velocity reference signal and outputs the result of subtraction as a drive signal of said first motor; and wherein said second numerical control means includes: rotating speed signal generating means whereby the frequency of said pulses from said second encoder means is output as a rotating speed signal of said cutting edges; and second subtract means which subtracts said rotating speed signal from said second velocity reference signal and outputs the result of subtraction as a drive signal of said second motor.

4. The rotary shear line of claim 3, wherein said first numerical control means includes: first count means in which an initial value is set for each cutting of said sheet stock and which additively or subtractively counts said pulses from said first encoder means in accordance with the direction of rotation of said first encoder means; first signal converting means for converting the count value of said first count means into a velocity signal; first switching means for selectively applying the output of said first velocity reference signal generating means and the output of said first signal converting means as said first velocity reference signal to said first subtract means; and first sign detecting means which detects the sign of the output of said first velocity reference generating means and switching said first switching means accordingly; and wherein said second numerical control means includes: second count means in which an initial value is set for each cutting of said sheet stock and which additively or subtractively counts said pulses from said second encoder means in accordance with the direction of rotation of said second encoder means; second signal converting means for converting the count value of said second count means into a velocity signal; second switching means for selectively applying the output of said second velocity reference generating means and the output of said second signal converting means as said first velocity reference signal to said first subtract means; and second sign detecting means which detects the sign of the output of said second velocity reference generating means and switches said second switching means accordingly.

5. The rotary shear line of claim 2, 3, or 4, wherein said first encoder means is coupled to said first motor.

6. The rotary shear line of claim 2, wherein said first encoder means is provided in rotary contact with said sheet stock.

7. The rotary shear line of claim 1, wherein said arithmetic means sets the frequency of said reference pulses and said synchronization length to be provided to said second numerical control means to values larger than those which are provided to said first numerical control means.

8. The rotary shear line of claim 1, 2, 3, or 4, wherein said arithmetic means includes means whereby, letting acceleration of said rotary shear, acceleration of said feeder, said synchronization length, a circumferential length of one rotation of the locus of said cutting edges, and said cutting length be represented by $a_S$, $a_F$, $L_S$, $L_{SO}$, and $L$, respectively, said synchronization length $L_S$ is calculated by the following equation:

$$L_S = \frac{L_{SO}(a_F/a_S) + L}{1 + (a_F/a_S)},$$

and whereby, letting said synchronous speed and the average feed rate of said sheet stock be represented by $V_S$ and $V_L$, respectively, said synchronous speed $V_S$ is calculated by the following equation:

$$V_S = \frac{L_S}{L} V_L.$$

9. The rotary shear line of claim 1, 2, 3, or 4, wherein said arithmetic means includes means whereby, letting said synchronous speed, the average feed rate of said sheet stock, said synchronization length, and said cutting length be represented by $V_S$, $V_L$, $L_S$, and L, respectively, said synchronization length $L_S$ is calculated by the following equation:

$$L_S = \frac{V_S}{V_L} L.$$

* * * * *